Feb. 13, 1940.　　　　P. S. WARD　　　　2,190,201
BAKING PAN
Filed March 15, 1938　　　2 Sheets-Sheet 1

INVENTOR.
Paul S. Ward.
BY
Wood & Wood ATTORNEYS

Feb. 13, 1940. P. S. WARD 2,190,201
BAKING PAN
Filed March 15, 1938 2 Sheets-Sheet 2
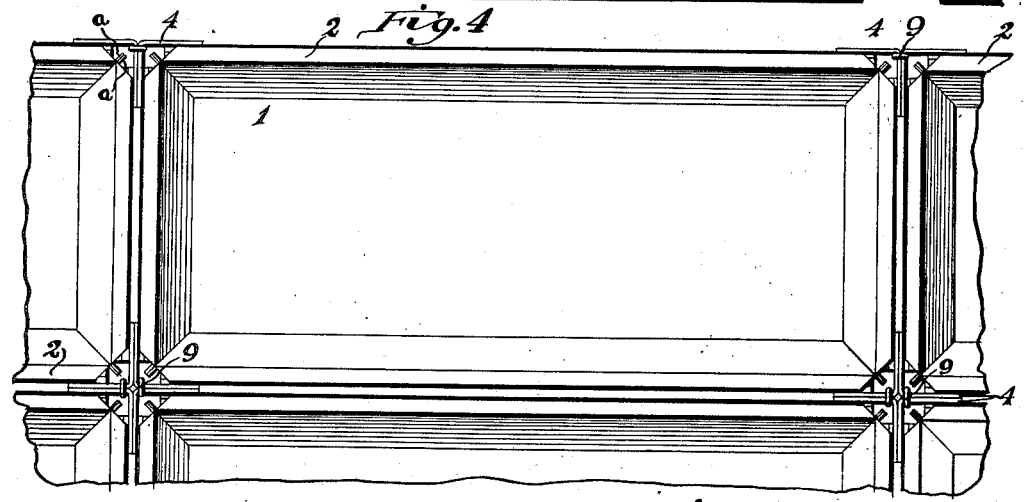
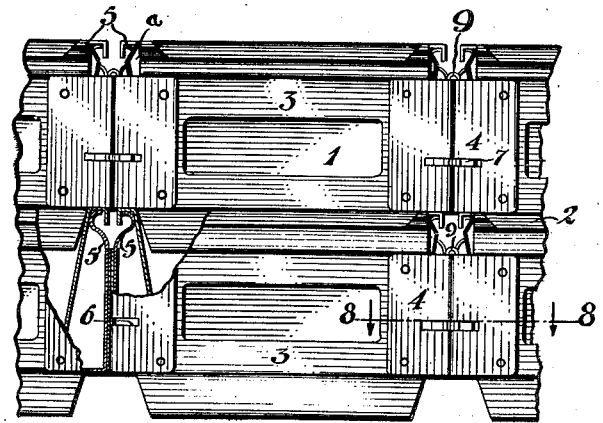
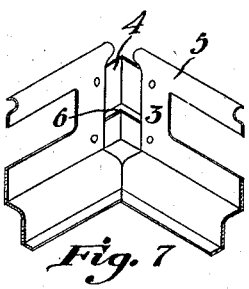
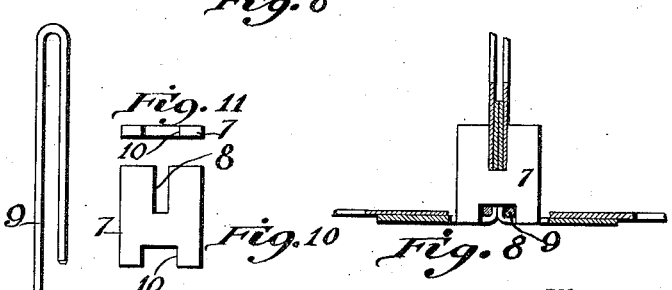
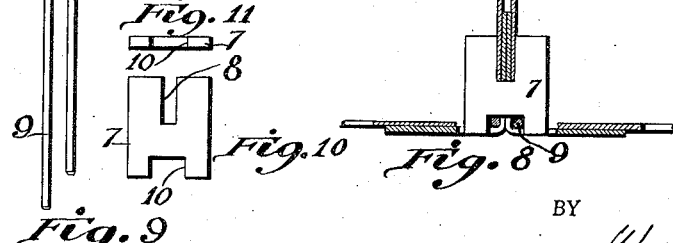
INVENTOR.
Paul S. Ward
BY
Wood & Wood
ATTORNEYS Patented Feb. 13, 1940

2,190,201

UNITED STATES PATENT OFFICE 2,190,201

BAKING PAN

Paul S. Ward, Cincinnati, Ohio

Application March 15, 1938, Serial No. 196,013

9 Claims. (Cl. 53—6)

This invention relates to improvements in baking pans and to a pan-enclosing frame for protecting the pan against injury and deformation in handling and stacking, and to sustain the pan so that its bottom will be at a slight elevation above the oven hearth or bottom, free from direct contact therewith to prevent scorching or burning the bottom of the contents in baking. The frame also provides for assembling a plurality of pans into a group or unit.

The pans are preferably formed of thin sheet aluminum, which metal, it has been experienced, offers many advantages and savings over tin-coated steel pans now commonly employed. Aluminum possesses a superior heating absorption and conductivity value over steel, so that the heat transfer to the contents of the pan is accelerated. This leads to faster baking upon maintaining a baking temperature, or baking at a lower temperature when the baking time is maintained.

The greasing cost is materially reduced as it is unnecessary, as for sheet steel pans, to grease the pans after each baking. An aluminum pan need be greased only occasionally. The aluminum pan also cools quicker, making reuse of the pans more frequent. Aluminum pans, however, are easily dented and thus necessitate the use of a heavier gauge material. This effects a material increase in cost over tin-coated steel pans, which investment cost, for a bakery, is a deterrent to a more extended use of aluminum pans.

In providing a sheet metal encasement for the aluminum pan, its sheet gauge can be materially reduced, being fully protected against deformation in handling and stacking and the abuse to which pans are ordinarily subjected in peeling the bread in and out of the baking oven. The frame of the present invention thoroughly protects the bottom of the pan so that the possibility of deformation is materially reduced and the bottom of the pan, at all times, is in an elevated position above the base of the frame, free from direct contact with the oven hearth. Thus the objections heretofore encountered when the bottoms of pans were dented, allowing portions thereof to rest upon the hearth while other portions were free from contact, resulting in burnt spots on the bottom of the loaf, are avoided.

It has been experienced that in suspending the pan within the oven in close proximity to the oven hearth, a more uniform baking results, free from any burnt spots, as no portion of the pan is in contact with a highly heated surface. The pan in the present instance is primarily intended as a means for shaping the bread and for holding its shape in baking, rather than a means for transferring the heat.

It is therefore an object of the invention to sheathe the sides of a baking pan with a sheet metal enclosure, suspendingly holding the pan spaced therefrom with the bottom thereof within the confines of the enclosure at an elevation above the plane of the oven hearth to avoid contact therewith.

Another object of the invention is to provide a baking pan sheathing enclosure of a form to permit nesting with another for stacking.

Various other features and advantages of the invention will be more fully set forth in a description of the accompanying drawings, in which:

Figure 4 is a fragmentary side elevation, partly in section, of several pan units connected in a group.

Figure 5 is a top plan view of several pans connected in a group.

Figure 6 is an end elevation, partly in section, of a pair of units nested.

Figure 7 is a perspective view of a corner section of a pan casing.

Figure 8 is a section on line 8—8, Figure 6, of a corner of two connected pan units.

Figure 9 is a plan view of a unit connecting staple or clip.

Figure 10 is a plan view of a connector or dowel plate.

Figure 11 is an end elevation of the plate.

Figure 1:
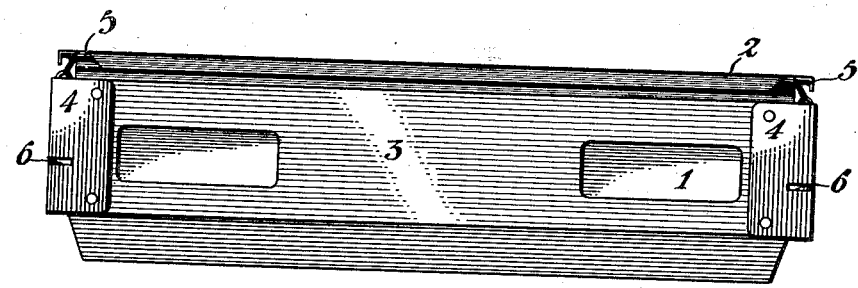
Figure 1 is a side elevation of the improved baking pan.
Figure 2:
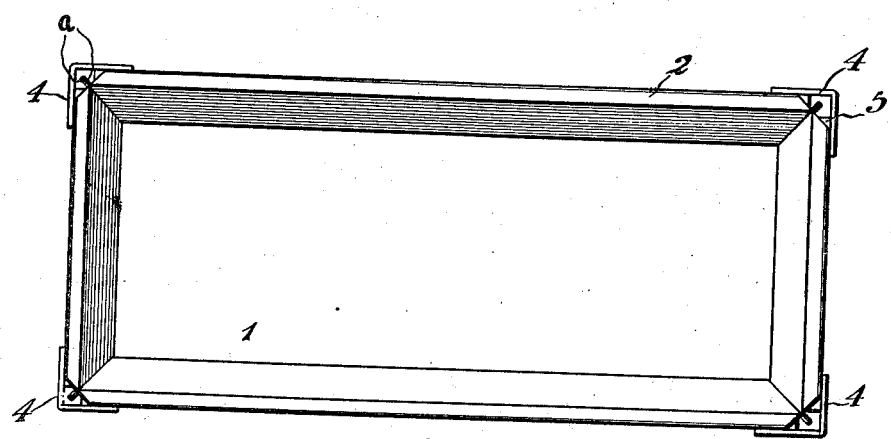
Figure 2 is a top plan view of the same.
Figure 3:
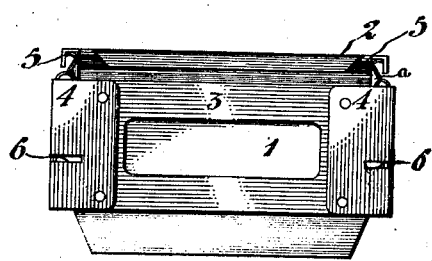
Figure 3 is an end elevation thereof.

Referring to the drawings, illustrating a preferred embodiment of the invention, 1 indicates a sheet metal bread or baking pan of rectangular form, having an outwardly channeled crimped upper edge or rim, 2. The pan is suspendingly mounted by its upper edge or rim to and within a supporting frame or pan sheathing enclosure 3, having a height greater than the pan in order to completely sheathe the sides of the pan to protect the same against injury of denting in handling or stacking. The bottom of the pan is within the confines of the frame and at an elevated plane when the frame is resting on the hearth of the oven to avoid any possible contact with the hearth or heating surface of the oven.

The pans preferably are of a specific corner form of construction differing materially from the conventional construction of bread baking pans, primarily to reduce the cost and simplify the manufacture to give greater stability at the corner of the pan and avoid strain or injury to the metal while shaping. The pan 1 is of a pattern outline to permit the side and end walls to be erected by bending the metal with the edges of adjoining walls meeting at the corners. The corner joint for adjacent walls is formed by diagonal outwardly extending flanges a—a respectively, at the end of each wall, meeting in face to face contact and welded or fused together, forming an outwardly extending rib for approximately the full length of the corner. The opposite longitudinal ends of the rib are preferably tapered to avoid any sharp obstruction. The top rim of the pan is preferably mitered at the corners to simplify the corner construction and provide clearance of advantage in assembling and securing a group of pan units side or endwise together.

The frame is preferably made of side and end wall sections of duplicate formation united together by angle or corner plates 4, each riveted or otherwise permanently secured to a pair of adjoining frame sections.

In making the frame of wall sections united by corner plates, it reduces the production cost and permits the use of heavier metal gauge corner plates for structure reenforcement at portions which are subjected to severe strains or abuse in handling.

The upper end or rim 5 of the walls of the frame or frame sections is flared inwardly with the extremities thereof rolled or curled outwardly for interfitting with the outwardly curved or channeled rim of the pan. The construction suspends the pan from its rim within the frame and spaced therefrom, and provides a separable connection for readily inserting or removing the pan from the frame, and a joint efficient against displacement under ordinary use.

The pan is held or limited against movement downwardly within the frame, making it impossible for the bottom to extrude or be exposed for contact with the oven hearth. The connection also encloses or inexposes the rim of the frame, avoiding any obstruction about the mouth of the pan. The sides of the frame are perforated or apertured for ventilation and to provide hand holds.

The lower margin of the frame is flared inwardly and at an angle to taper the same for nesting into the upper end of a second unit with its extremity flanged laterally inwardly, shielding the corner at the bottom of the pan and leaving the bottom of the frame open.

For commercial baking it is desirable to have a plurality of units in group assembly and for this purpose the corner plates, preferably about midway of the height of the corner, have a notch or aperture 6 therethrough, the notch cutting through the corner and aligning or registering with a corresponding aperture or notch of the corner plate of an adjoining or second unit for the reception of a dowel plate 7. The plate has a longitudinal slot 8 centrally therein, adapting the plate to straddle the adjoining contact walls of the pan frame as it is inserted within the registering slits of the corner plates. The dowel plate is locked in place by a U-shaped clip 9, which, as shown in Figures 5 and 8, clasps over the adjoining corner plates of a pair of abutted pan units and engages through a slot 10 in the dowel plate. The clip, if necessary, can be clinched at its ends to prevent displacement.

The frame sections provide open corners for air circulation through the jacket space, formed by the frame about the pan, which is of advantage in baking or in cooling the pans. A similar connection is made for each of the corners in assembling a number of pans sidewise or endwise in a group, and the connection provides sufficient stability for the ordinary handling of the pans in baking and stacking. By this means separate units can be readily assembled into a unitary group, or disassembled, if necessary, and any number, optional to the baker can be grouped to meet different oven capacities.

It is recognized that various methods may be employed for separably connecting the units into a group, the method illustrated, however, being very simple and efficient.

The beaded rim at the top and the inwardly tapering base at the bottom of the frame, additionally serve to strengthen the walls of the frame and thereby permit the use of a lighter gauge of sheet material for reducing the weight of the unit. The shoulder formation for the base of the frame provides for seating the frame of a superposed unit upon the rim of a lower unit in stacking, limiting the degree of nesting, and thus avoids wedging the units together in stacking.

The frame thoroughly protects the pan against denting, permitting the pans to be made of a comparatively thin gauge of aluminum, affording a material reduction in cost compared to the weight of the aluminum pans now employed. As the many advantages of aluminum as a baking pan material are well recognized by the trade, a further elaboration need not be made herein.

It has been experienced that the emissivity can be materially altered, which is very advantageous for a baking pan, by coating the outside of the aluminum baking pan, preferably with a commercial black soyabean lacquer. Soyabean lacquer withstands a high degree of temperature, considerably in excess of that ever used in baking, so that there is no danger of its destruction by excessive heat, or giving off any vapor that may be deleterious to the baking product, and as the exterior surface of the pan is jacketed, it receives the same protection as the pan. The coating provides a means of regulation, controlled by the manner and degree of coating, so that different baking results for a given heat and time can be obtained by light and heavy coatings or by partial or spot-coating the outer surface of the pan. A black coated aluminum pan with its bottom free from direct contact with the heating surface, enables the production of a higher standard and more uniformly baked loaves of bread.

The material of the pan and frame preferably are of a low heating capacity and with the design of frame structure provide for a quick inception of baking upon entering the oven, and low heating waste upon removal from the oven. A quick cooling, and hence shorter length of time for reloading is provided, thus lessening the number of pans to be employed and a comparative resultant in baking time, increasing oven capacity. The pan nonseating upon the oven hearth provides for uniformity of receptivity and avoids the objections as when a pan unevenly bears upon the oven hearth.

Having described my invention, I claim:

1. The combination of a baking pan and a sheet metal frame for exteriorly jacketing the sides of the pan having a rim recessed from the body of the frame and interfitting with the rim of the pan for replaceably connecting with the same and suspendingly supporting the pan with the bottom thereof within the confines of the frame and at an elevation above contact with the oven hearth or floor, and marginally protected by the frame, the frame at its lower portion recessed for nesting one unit with another for stacking.

2. The combination of a baking pan and a sheet metal frame for enclosing the sides of the pan with a jacket space therebetween, the frame and pan rims interfitting for replaceably connecting with the same and suspendingly supporting the pan with the bottom thereof within the confines of the frame and at an elevation above contact with the oven hearth or floor, and the rims of the pans and frames recessed within the contour of the body portion of the frame to protect the same and to permit a plurality of pan and frame assemblies to be adjacently joined into a unit.

3. The combination of a baking pan of aluminum sheet material and a sheet metal enclosure for the pan for protecting the same against injury and deformation on handling, the lower portion of the enclosure formed for partially nesting one unit within another for stacking with the pans free from contact with one another and the upper portion of the enclosure recessed to bring the same within the contour thereof and adapt it to be interfittingly connected with a rim of a pan.

4. The combination of a baking pan and a sheet metal enclosure therefore, connected together at their rims, the enclosure of a height in excess of the pan suspending, the pan with its bottom at an elevation above an oven hearth and providing a jacket space completely around the pan, ventilated through apertures in the enclosure and the lower portion of the enclosure conjugally formed for stacking one unit upon another, the rims of the enclosure and pan located within the contour of the frame to be protected by the body of the enclosure and adapt a plurality of pan and enclosure assemblies to be compactly joined side by side into a unit.

5. The combination of a baking pan and a sheet metal enclosure for the sides of the pan connected together at their rims, the lower portion of the enclosure conjugally formed for stacking one unit upon another and means for connecting one unit onto the other for grouping a plurality of units.

6. A set of baking pan units each comprising a baking pan and a sheet metal enclosure for the sides thereof, the pan and enclosure connected together at their rims, and means for joining a plurality of units into a group, connected at the corners of the adjacent pan enclosures.

7. The combination of a baking pan formed of sheet aluminum and a sheet metal frame exteriorly jacketing the pan, with the body of the pan spaced from the body of the frame, the pan and frame having interfitting rims for effecting an assembly union, the rims recessed within the body contour of the frame and the lower portion of the frame conjugally formed for nestingly stacking the pan and frame assemblies, one upon another, reinforcing means for the corners of the frame and means for joining a plurality of assemblies side by side into a group.

8. The combination of a baking pan formed of sheet aluminum and a sheet metal frame exteriorly jacketing the pan, with the body of the pan spaced from the body of the frame, the pan and frame having interfitting rims for effecting an assembly union, the rims recessed within the body contour of the frame, the lower portion of the frame conjugally formed for nestingly stacking the pan and frame assemblies, one upon another, and means for joining a plurality of assemblies at their corners side by side into a group.

9. The combination of a baking pan formed of sheet aluminum and a sheet metal frame exteriorly jacketing the pan, with the body of the pan spaced from the body of the frame, the pan and frame having interfitting rims for effecting an assembly union, the lower portion of the frame conjugally formed for nestingly stacking the pan and frame assemblies, one upon another, and means for joining a plurality of assemblies at their corners side by side into a group.

PAUL S. WARD.